(12) United States Patent
Nystad et al.

(10) Patent No.: US 8,719,555 B2
(45) Date of Patent: May 6, 2014

(54) METHOD FOR OVERCOMING LIVELOCK IN A MULTI-THREADED SYSTEM

(75) Inventors: Jorn Nystad, Trondheim (NO); Frode Heggelund, Trondheim (NO)

(73) Assignee: ARM Norway AS, Trondheim (NO)

( * ) Notice: Subject to any disclaimer, the term of this patent is extended or adjusted under 35 U.S.C. 154(b) by 1068 days.

(21) Appl. No.: 12/068,012

(22) Filed: Jan. 31, 2008

(65) Prior Publication Data

US 2009/0198969 A1 Aug. 6, 2009

(51) Int. Cl.
*G06F 7/38* (2006.01)
*G06F 15/00* (2006.01)
*G06F 9/00* (2006.01)
*G06F 9/44* (2006.01)

(52) U.S. Cl.
USPC .......................................................... 712/225

(58) Field of Classification Search
USPC .......................................................... 712/220
See application file for complete search history.

(56) References Cited

U.S. PATENT DOCUMENTS

| | | | |
|---|---|---|---|
| 5,016,169 A | 5/1991 | Koya et al. | |
| 5,644,752 A | 7/1997 | Cohen et al. | |
| 6,216,200 B1 | 4/2001 | Yeager | |
| 6,259,460 B1 | 7/2001 | Gossett | |
| 6,260,131 B1 | 7/2001 | Kikuta et al. | |
| 6,650,333 B1 | 11/2003 | Baldwin | |
| 6,668,308 B2 * | 12/2003 | Barroso et al. | 711/141 |
| 6,801,986 B2 | 10/2004 | Steely et al. | |
| 6,950,909 B2 | 9/2005 | Guthrie et al. | |
| 6,965,970 B2 | 11/2005 | Mosur et al. | |
| 6,988,170 B2 | 1/2006 | Barroso et al. | |
| 6,993,628 B2 * | 1/2006 | Starke | 711/134 |
| 7,284,094 B2 * | 10/2007 | Hrusecky et al. | 711/128 |
| 7,454,590 B2 | 11/2008 | Jordan et al. | |
| 7,461,210 B1 * | 12/2008 | Wentzlaff et al. | 711/135 |
| 7,539,845 B1 * | 5/2009 | Wentzlaff et al. | 712/10 |
| 7,577,820 B1 * | 8/2009 | Wentzlaff et al. | 712/10 |
| 7,774,531 B1 * | 8/2010 | Karlsson | 710/220 |
| 7,814,292 B2 | 10/2010 | Tsien | |
| 7,818,544 B2 | 10/2010 | Abernathy et al. | |
| 2003/0126369 A1 | 7/2003 | Creta et al. | |
| 2003/0165147 A1 | 9/2003 | Shimada | |
| 2005/0002371 A1 | 1/2005 | Andersen | |
| 2005/0044319 A1 | 2/2005 | Olukotun | |

(Continued)

OTHER PUBLICATIONS

Rajwar et al.; Speculative Lock Elision: Enabling Highly Concurrent Multithreaded Execution; Dec. 2001; MICRO '01.*

(Continued)

*Primary Examiner* — Corey S Faherty
(74) *Attorney, Agent, or Firm* — Nixon & Vanderhye P.C.

(57) ABSTRACT

A microprocessor pipeline arrangement 1 includes a plurality of functional units $P_1, P_2, P_3, \ldots, P_N$. A number of the functional units $P_1, P_3, P_N$ have access to a respective cache memory $C_1, C_3, C_N$ from which it can retrieve data needed to process threads that pass through the pipeline. The pipeline arrangement 1 also includes a number of monitors to determine when the system enters a state of livelock (e.g. inter-cache livelocks, intra-cache livelocks and/or "near-livelock" situations): a top-level monitor MT to detect livelock situations in the pipeline as a whole; and second-level ("local") monitors $M_1$ and $M_3$ associated with individual caches $C_1$ and $C_3$.
If the system is determined to have entered a livelock state, e.g. by the top-level monitor $M_T$, the number of threads able to change the contents of one or more of the caches $C_1, C_3, C_N$ is reduced.

14 Claims, 1 Drawing Sheet

(56) References Cited

U.S. PATENT DOCUMENTS

| | | |
|---|---|---|
| 2006/0064549 A1* | 3/2006 | Wintergerst ............... 711/134 |
| 2006/0184753 A1 | 8/2006 | Jeter et al. |
| 2007/0050601 A1* | 3/2007 | Chaudhry et al. ........... 712/214 |
| 2007/0067505 A1 | 3/2007 | Kaniyur et al. |
| 2007/0106874 A1 | 5/2007 | Pan et al. |
| 2008/0005504 A1* | 1/2008 | Barnes et al. ............... 711/156 |
| 2008/0091880 A1 | 4/2008 | Vishin |
| 2008/0320230 A1* | 12/2008 | Vishin et al. ............... 711/141 |

OTHER PUBLICATIONS

A. Ho et al, "On deadlock, livelock, and forward progress" Technical Report No. 633, University of Cambridge Computer Laboratory, May 2005, pp. 1-8.

T. Li et al, "Spin Detection Hardware for Improved Management of Multithreaded Systems" IEEE Transactions on Parallel and Distributed Systems, vol. 17, No. 6, Jun. 2006, pp. 508-521.

S. Abdelwahed et al, "Blocking Detection in Discrete Event Systems" 6 pages.

Related U.S. Appl. No. 12/068,009, filed Jan. 31, 2008; Inventor: Sørgård et al.

Related U.S. Appl. No. 12/068,010, filed Jan. 31, 2008; Inventor: Nystad et al.

Office Action mailed Jul. 9, 2010 in co-pending U.S. Appl. No. 12/068,010.

Office Action mailed Nov. 23, 2010 in co-pending U.S. Appl. No. 12/068,009.

D. Kim et al, "An SoC With 1.3 Gtexels/s 3-D Graphics Full Pipeline for Consumer Applications" IEEE Journal of Solid-State Circuits, vol. 41, No. 1, Jan. 2006, pp. 71-84.

H. Igehy et al, "Prefetching in a Texture Cache Architecture" 1998, Eurographics/SIGGRAPH Workshop on Graphics Hardware.

D. Blythe, "The Direct3D 10 System" 2006, ACM.

"Cray MTA" http://www.cmf.nrl.navy.mil/CCS/help/mta/2002.

Final Office Action mailed Jul. 19, 2011 in co-pending U.S. Appl. No 12/068,009.

Final Office Action mailed Nov. 1, 2011 in co-pending U.S. Appl. No. 12/068,010.

Notice of Allowance mailed Dec. 26, 2013 in co-pending U.S. Appl. No. 12/068,010.

\* cited by examiner

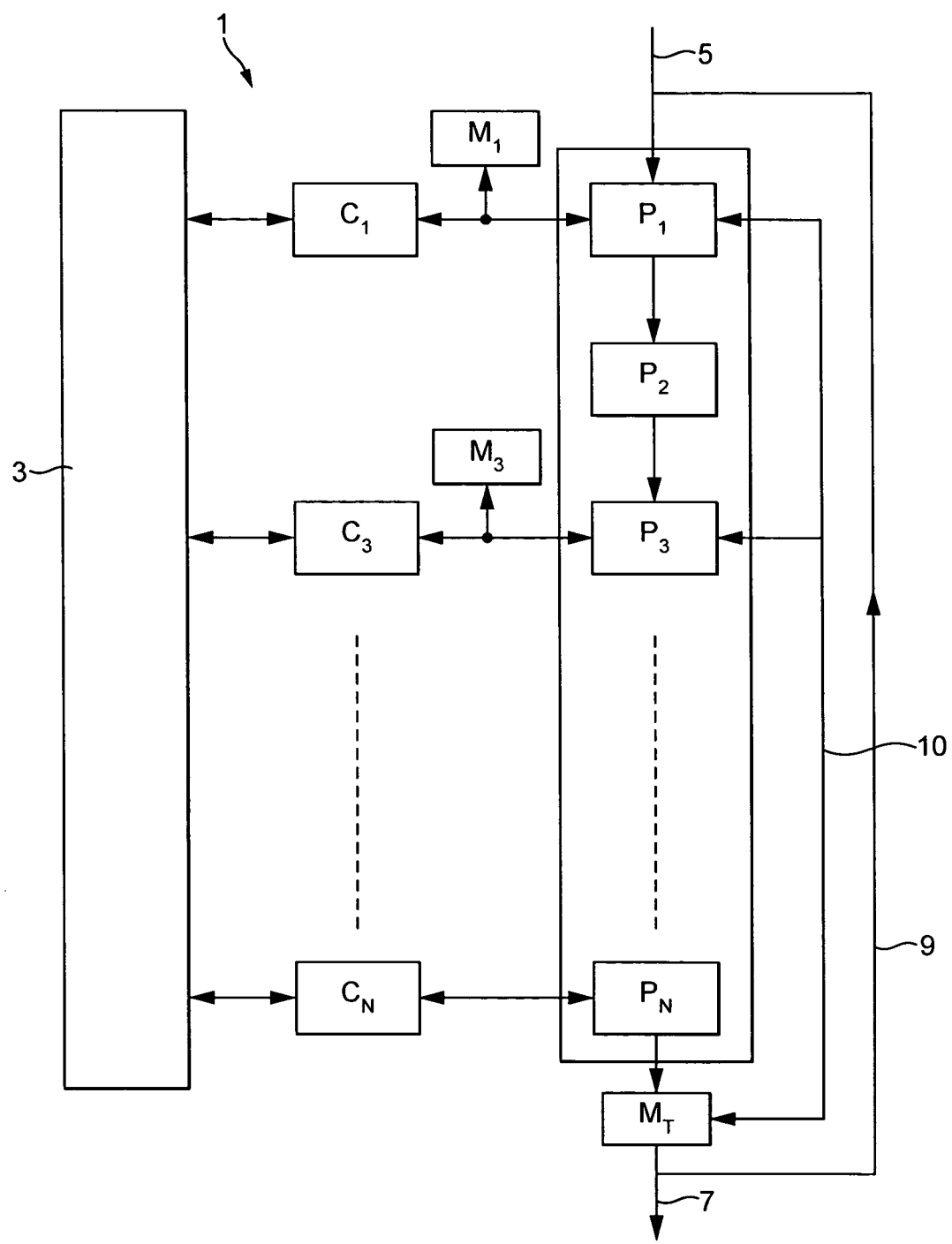

METHOD FOR OVERCOMING LIVELOCK IN A MULTI-THREADED SYSTEM

The present invention relates to microprocessor systems and in particular to microprocessor systems that process plural threads simultaneously (so-called "multithreaded" microprocessor systems).

Many microprocessors include plural functional or execution units that are arranged in a linear, pipelined fashion, in which a given thread for execution is passed down the pipeline and processed by the functional units of the pipeline one after another, in turn.

An example of such a microprocessor arrangement is a graphics processor which, as is known in the art, will typically include, inter alia, a so-called "rendering pipeline" in which the different function units of the rendering process, such as fragment shading units, texturing units, fogging units and blending units, etc., are arranged one after another in a linear or pipelined fashion and receive in turn a given fragment (graphics data element) for processing. The rendering process is carried out in this fashion because the individual rendering operations are typically independent of each other, and can frequently be carried out without reference to other operations or fragments, such that they can be carried out in a linear, pipelined fashion without detriment.

While it would be possible in such pipelined microprocessor arrangements to send given threads for execution through the pipeline one at a time (i.e. so that a thread does not enter the pipeline until the previous thread has exited the pipeline), it is also known to send multiple threads through the pipeline at any one time, one after another in series, such that a series of threads will progressively pass through the pipeline stages in turn. Such arrangements that can process multiple threads simultaneously are typically referred to as "multithreaded" processors or arrangements.

An example of a "multithreaded" processing arrangement is a graphics processing pipeline.

In the case of a graphics processing pipeline, the threads may, e.g., be the graphics "fragments" that the pipeline is to process (e.g. render). (As is known in the art, graphics rendering operations are usually carried out on discrete graphical entities or elements, usually referred to as "fragments", which represent and correspond to a given position in the scene to be displayed, and comprise, in effect, a set of data (such as colour and depth values) and, possibly, program instructions, for the position in question. Each such graphics fragment (data element) may correspond to a single pixel (picture element) in the final display (since as the pixels are the singularities in the final picture to be displayed, there may be a one-to-one mapping between the fragments the graphics processor operates on and the pixels in the display), but this is not essential and there may not be a one-to-one correspondence between "fragments" and display "pixels", for example where particular forms of post-processing such as down-sampling are carried out on the rendered image prior to its display.)

In such an arrangement, as is known in the art, graphics fragments (threads) for rendering will be sent through the rendering pipeline one after another in series, and at each execution cycle step down to the next step in the pipeline, such that at any given time, each step of the rendering pipeline will receive a fragment, and then at the next cycle, receive the next fragment for processing, and so on.

As will be appreciated by those skilled in the art, in these arrangements, each "thread" in the graphics pipeline will typically represent and correspond to an instance of the program a graphics fragment is executing.

However, the "threads" in pipelined microprocessor arrangements need not be or represent graphics fragments, but can be other forms of "threads", such as program threads, etc.

A problem that can arise with a multithreaded, pipelined microprocessor arrangement is that sometimes a given thread cannot be processed by the functional unit (pipeline stage) it has reached. This may be because, for example, the functional unit needs other data in order to be able to process the thread, but that data may not be present in a cache memory associated with the functional unit and so may need fetching from other memory in order for the thread to be processed (i.e. a so-called "cache miss" occurs).

In such a "cache miss" situation, it is usual to trigger the fetching and loading of the relevant data in the cache memory and to return the thread to the functional unit at a later time (either by stalling the thread and returning it to the functional unit or by later issuing a new thread corresponding to the "failed" thread) when it is expected that the fetched, originally missing, data should now be present in the cache memory.

When the thread again arrives at the functional unit at which it had not been processed, the intention is that the cache should now contain the required data after having been appropriately updated, such that the thread can now be processed by the functional unit in question.

A problem may arise, however, if the data fetched by the cache to process a first, "failed" thread is overwritten by data fetched subsequently in order to process a second thread before the first thread again reaches the functional unit (i.e. is returned to the functional unit).

For example, if a first thread is unable to be processed at a particular functional unit, then the data required for processing this first thread, e.g. "data A" is fetched and loaded into the cache. However, if a second thread, following after the first thread, is also unable to be processed as it requires different data to be processed, e.g. "data B", then the cache will fetch data B, which may overwrite data A before the first thread is returned to the functional unit.

If this happens, then when the first thread again reaches the functional unit, the first thread is still unable to be processed, as the cache contains data B instead of the required data A, and thus for a second time the first thread must be held up whilst the cache again fetches data A. Then, if when the second thread again reaches the functional unit, the cache contains the newly fetched data A rather than the required data B for the second thread, then the second thread cannot be processed at that stage either and so must wait whilst the cache fetches data B, and so on.

In a multithreaded pipelined arrangement, this situation could occur for multiple functional units and multiple threads simultaneously.

Without intervention, such a scenario can potentially continue ad infinitum with the first and second threads continually being returned to the functional unit without ever being fully processed.

Such a situation where different threads cause the cache of a functional unit to refill before other threads have used data that they require in the cache, and which is repeated ad infinitum, is commonly referred to as a "livelock".

This is in contrast to a "deadlock" in which threads are prevented from being processed as they require a resource that will never become free. Typically, a deadlock situation occurs when several threads require the same resources in order to be processed, and wherein one thread "holds" one resource and another thread "holds" another resource. As both threads require both resources in order to be processed, and as neither thread will relinquish its hold on the resource it already has, then neither thread can be processed.

In a "livelock" situation, such as that described above, the threads are always allowed to use the resources they are requesting, however, they do not retain the resources until processing is complete. Accordingly, when several threads are competing for the same resource, the resource may not be available at the time it is needed, and thus the resource will be continually reallocated without any of the threads being processed.

It would be possible to avoid such a "livelock" situation arising by having cache memories that are large enough to hold sufficient data for all the threads that may require data in the pipeline at any one time. However, the use of such large caches, in particular in long pipelines that have many functional units and that carry many threads simultaneously, may not always be desirable or practical. For example, in embedded and low power systems and systems for use in portable or constrained devices, it may not be desirable to provide large cache memories for each functional unit of a microprocessor pipeline.

It is also known in the art to, in a "livelock" situation, stall and flush or restart the processing that has caused the livelock. However, again, this may not be desirable or suitable in all situations.

The Applicants therefore believe that there remains scope for improvements to multithreaded, pipelined, microprocessor arrangements.

According to a first aspect of the present invention there is provided a method of operating a microprocessor system that includes a plurality of functional units arranged in a pipelined fashion and in which at least one stage in the pipeline can process a thread for execution at the same time as other stages in the pipeline are processing other threads for execution, one or more of the functional units each including or having associated with it a cache memory for data to be used by the functional unit when processing a thread, the method comprising:

detecting whether the system is in a livelock state; and if a livelock state is detected, preventing one or more of the threads in the pipeline from being able to change the contents of one or more of the caches.

According to a second aspect of the present invention there is provided a microprocessor system for processing a plurality of threads, the system comprising:

a plurality of functional units arranged in a pipelined fashion, one or more of the functional units being operable to receive and process a thread received from the preceding functional unit in the pipeline and to pass a thread after processing to the next functional unit in the pipeline, and one or more of the functional units each including or having associated with it a cache memory for data to be used by the functional unit when processing a thread;

means for detecting whether the system is in a livelock state; and means for preventing one or more of the threads in the pipeline from being able to change the contents of one or more of the caches if a livelock state is detected.

The present invention relates to a pipelined microprocessor system in which functional units of the pipeline may require data stored in associated cache memories in order to process a thread. Moreover, it is detected whether or not the system is in a livelock state, and if the system is in said state, then one or more threads are prevented from being able to change data in one or more of the caches. In other words, if a livelock situation is detected, the number of threads in the pipeline that are able to change the contents of the cache memories of the pipeline, e.g. data, instructions, etc, is reduced or decreased.

Thus, according to a third aspect of the present invention there is provided a method of operating a microprocessor system that includes a plurality of functional units arranged in a pipelined fashion and in which at least one stage in the pipeline can process a thread for execution at the same time as other stages in the pipeline are processing other threads for execution, one or more of the functional units each including or having associated with it a cache memory for data to be used by the functional unit when processing a thread, the method comprising:

detecting whether the system is in a livelock state; and if a livelock state is detected, reducing the number of threads in the pipeline that are allowed to change the contents of one or more of the caches.

According to a fourth aspect of the present invention there is provided a microprocessor system for processing a plurality of threads, the system comprising:

a plurality of functional units arranged in a pipelined fashion, one or more of the functional units being operable to receive and process a thread received from the preceding functional unit in the pipeline and to pass a thread after processing to the next functional unit in the pipeline, and one or more of the functional units each including or having associated with it a cache memory for data to be used by the functional unit when processing a thread;

means for detecting whether the system is in a livelock state; and means for reducing the number of threads in the pipeline that are allowed to change the contents of one or more of the caches if a livelock state is detected.

The Applicants have recognised that restricting the ability of threads to change the contents of the caches when a livelock situation is detected can result in recovery from the livelock situation because the threads that are prevented from changing data in the caches should no longer cause data required by other threads to be overwritten in the caches before those other threads are processed. In this way, threads that were previously being prevented from being processed by the livelock situation should no longer be prevented from being processed, and so the system can recover from the livelock.

Thus, for example, using the exemplary situation set out above, when a first thread is unable to be processed at one of the functional units in the system, and the cache fetches data A (i.e. the data required for processing the first thread), if, as in the present invention, the second thread is prevented from causing a change in the data in the cache, then when the second thread arrives at the functional unit, it will not trigger the updating of the data in the cache, and so therefore, data A, and not data B (the data required for processing the second thread), will still be retained in the cache when the first thread arrives at the functional unit again (and thus the first thread can be processed by the functional unit and subsequently exit the pipeline).

The Applicants have further found that the present invention is particularly applicable to and useful for microprocessor arrangements where the cache memories of the pipeline are not sufficiently large to hold all the data that may be required by threads in the pipeline, such as, and in particular, in constrained systems that have long pipelines, such as (embedded) graphical processing systems, wherein the caches included in or associated with the various functional units of the pipeline are too small to hold all of the data required to process all of the threads in the system.

The arrangement of the present invention can also allow recovery from a livelock situation without detrimental effect on threads that are able to be processed using data already in the cache memories (i.e. that are "hitting" the caches).

The means for and step of detecting when the system is in a state of livelock can be of any suitable and desired form.

A livelock state for the purposes of the present invention is preferably considered to arise if a livelock situation occurs in a single cache (as described in the above example) (an intra-cache livelock), and/or if a livelock situation occurs as a result of the (conflicting) interaction of two or more caches (an inter-cache livelock), and preferably in both these situations.

In a particularly preferred embodiment, the livelock state of the present invention also encompasses situations that may be commonly referred to in the art as "near-livelocks". For example, if one or more caches of the pipeline arrangement are being heavily used (i.e. being accessed and updated by many of the threads passing through the pipeline), then the caches may experience a large degree of cache trashing. (Cache trashing, as is known in the art, refers to the loss (trashing) of data on a cache-line as it is overwritten by new data required, for example, to process a thread.) When one or more of the caches experience a substantial level of cache trashing, the memory bandwidth of the system can increase dramatically, thus decreasing the performance of the system, even though it may not get to be a "full" livelock.

The Applicants have recognised that restricting the ability of threads to change the contents of one or more of the caches when a near-livelock situation is detected can cause the degree of cache trashing to decrease, and thereby allow the system to recover from the near-livelock state. In other words, by preventing one or more of the threads from having writing access to one or more of the caches, the number of times a cache is updated in a given period should typically decrease, and thus amount of cache trashing should also decrease. Accordingly, the Applicants have found that the present invention, following the detection of a near-livelock situation, can allow the memory bandwidth of the system to be reduced to an acceptable level, and thus the performance to increase.

Thus, in a particular preferred embodiment, a livelock situation for the purposes of the present invention is also considered to arise when a near-livelock state is entered.

In a preferred embodiment, the system preferably comprises some form of livelock "monitor" that continually monitors the pipeline (i.e. the entire pipeline and/or portions of the pipeline) to see if a livelock state could have arisen, and preferably comprises a plurality of such livelock monitors.

The livelock detection should, as discussed above, essentially provide some indication that a livelock state has or could have been entered. Preferably, the potential or actual existence of a livelock state is taken as arising when the pipeline (system) enters a particular, preferably predefined or predetermined, state, e.g., and preferably, that has been previously defined or selected as indicating and being indicative of a livelock situation.

Thus, in a particularly preferred embodiment, the means for or step of detecting a livelock state comprises determining whether the pipeline and/or system has entered a particular, preferably predefined or predetermined, state. This is preferably determined to have arisen when one or more of the predefined or predetermined conditions or criteria to be taken as indicating a livelock state for the purposes of operating the system in the manner of the present invention (as discussed above) are met or have arisen.

The state or condition(s) that is taken to be indicative of a livelock situation can be any suitable and desired such state. In a preferred embodiment it relates to whether, and/or how quickly, threads in the pipeline are making process in their execution (as if threads are not making progress, that may be indicative of a livelock or near-livelock situation).

Thus, in a preferred embodiment, the livelock detection comprises determining whether any threads in the pipeline are making progress in their execution or not. This is preferably done by detecting and monitoring the complete and/or partial completion of instructions associated with a thread. Complete completion of instructions of a thread occurs, as will be appreciated, when a thread has been processed by each of the functional units as required and is thus in a position to exit the pipeline. On the other hand, partial completion of instructions of a thread refers to any progress in its execution made by a thread as it passes along the pipeline, e.g. the processing of (completion of an instruction in) a thread by one or more of the functional units in the pipeline arrangement.

In a particularly preferred embodiment, both the complete and partial completion of instructions associated with a thread are detected and monitored. The Applicants have found that this allows the occurrence of a livelock state to be detected with a greater efficiency than by detecting only the complete processing of threads passing through the pipeline.

The present invention therefore preferably includes means for and a step of identifying and/or determining whether a thread has been processed by at least one of the functional units in the pipeline. Such means for and step of identifying and/or determining preferably further comprises means for and a step of identifying and/or determining whether a thread has been fully processed (i.e. whether a thread has been processed or passed as appropriate by each of the functional units in the pipeline. As will be appreciated, such means is provided, for example, so that if a thread has not been processed, or only partially processed, then the thread can be, and preferably is, recirculated through the pipeline for further processing.

This means for or step of identifying and/or determining can be performed in any suitable and desired manner.

For example, in a particularly preferred embodiment, one, some or all of the threads passing through the pipeline arrangement preferably have associated with them information indicating the extent to which the thread has been processed. The information may comprise any suitable identifier, for example, and preferably, one or more tags and/or flags.

Such information, as will be appreciated, is particularly beneficial in determining whether a thread has been fully processed. Accordingly, the information associated with one, some or all of the threads passing thorough the pipeline arrangement preferably comprises information indicating whether the thread has been fully processed. The information may, however, be used additionally or alternatively to determine whether a thread has been partially processed.

In another preferred embodiment, one or more of the functional units of the pipeline arrangement preferably have associated with them information indicating whether a thread, typically, although not limited to, the last thread processed and/or passed by the functional unit, was processed. Such information, as will be appreciated, is particularly beneficial in determining whether a thread has been partially processed (i.e. whether an instruction was at least partially completed when a thread reached the functional unit).

As discussed above, the means for and step of detecting when the system is in a state of livelock preferably comprises one or more livelock monitors that continually monitor the pipeline to see if a livelock state may have arisen in at least a portion of the pipeline.

In a particularly preferred embodiment the present invention comprises one or more livelock monitors arranged to monitor the complete and/or partial completion of threads passing through the entire pipeline. These one or more livelock monitors may be viewed as "top-level" livelock monitors that determine livelocks in the pipeline as a whole.

The one or more top-level livelock monitors may be positioned at any suitable or desired locations in the pipeline arrangement. Preferably, however, they are positioned at the beginning and/or end of the pipeline, and more preferably before (upstream of) a start functional unit and/or after (downstream of) an end functional unit.

These one or more top-level livelock monitors preferably comprise means for assessing (reading) the information associated with the one or more of the threads and/or one or more of the functional units, as discussed above, to determine the extent to which threads have been processed.

The one or more top-level monitors are therefore arranged to monitor and detect livelocks in the pipeline arrangement as a whole, i.e. preferably, the progress of the threads through the pipeline as a whole. Thus, the one or more top-level livelock monitors can be used to detect whenever the system enters a livelock state, whatever the cause, e.g. inter-cache livelocks, intra-cache livelocks and/or near-livelock situations. Whilst the Applicant recognise that a livelock monitor of this type may be slower to detect, and subsequently recover from, a livelock situation originating, for example, in only a portion of the pipeline (e.g. intra-cache livelocks that are limited to a single cache), it does provide a more robust system that can potentially detect and recover from any livelock situation.

In a particularly preferred embodiment, the present invention comprises one or more (second-level or "local") livelock monitors arranged to monitor the partial completion of threads in one or more particular portions of the pipeline. These second-level livelock monitors may be instead of the one or more top-level livelock monitors discussed above, but are preferably in addition to the one or more top-level livelock monitors. Indeed, in a particularly preferred embodiment, the pipeline includes a top-level monitor and one or more second-level (local) livelock monitors.

The one or more second-level livelock monitors may also be positioned at any suitable or desired location in the pipeline arrangement. In a preferred embodiment, however, each of the one or more second livelock monitors is associated with (local to) one or more of the caches of the pipeline arrangement. Accordingly, each of the one or more second livelock monitors is preferably included in or associated with one of the functional units of the pipeline arrangement, the functional unit in turn further including or being associated with a cache memory. These "local" livelock monitors therefore preferably in particular monitor intra-cache livelocks, and, accordingly, preferably monitor the progress of threads through the particular portion (e.g. functional unit) of the pipeline with which they are associated (and preferably only the progress of threads through that particular portion of the pipeline).

It should be noted, however, that whilst each of the one or more caches of the pipeline arrangement may be associated with such a second-level (local) livelock monitor, the present invention is not limited in this regard and in some embodiments, and indeed in the preferred embodiment, only some of the caches have an associated second-level (local) livelock monitor.

Similarly, a or each second-level (local) livelock monitor may monitor a single cache, or a group of caches (such as a group of related caches), as desired. For example, in a particularly preferred embodiment in which the pipeline is a graphics processing pipeline, a texture-cache livelock monitor is associated with a texture-remapping-table cache, a texture-descriptor cache and a texture cache.

Further, and as will be appreciated, the one or more second-level livelock monitors preferably comprise means for assessing (reading) the information associated with one or more of the functional units, and particularly preferably with the functional unit to which it is included in or associated with, to determine whether a thread was processed (at least partially) by the functional unit in question.

The one or more second-level livelock monitors are thus arranged to detect the occurrence of livelocks in only portions of the pipeline, and in particular in the individual cache with which the monitor is preferably associated. The Applicants have found that such second-level (local) livelock monitors may provide an "early detection" of livelock situations in the portions of the system to which they relate (intra-cache livelocks). This early detection may allow the system to begin recovering from the livelock state, and preferably allows for the livelock situation to cease, before, for example, the original livelock state would be detected by the top-level livelock monitor. Consequently, the use of one or more second-level livelock monitors, which are preferably associated with individual caches, allows for an increased level of performance in the system than would be permitted by the use of only a top-level monitor, which is associated with the pipeline as a whole.

As will be appreciated, in the particularly preferred embodiment of the present invention in which the pipeline arrangement comprises a top-level livelock monitor and one or more second-level (local) monitors, the detection of a livelock state can be initiated by either the top-level livelock monitor or the one or more second-level (local) monitors. This is advantageous because, as discussed above, in the case of an intra-cache livelock, livelock recovery may be initiated firstly by one of the second-level (local) livelock monitors, but the top-level livelock monitors will allow the system also to detect inter-cache and other livelocks that the second-level (local) livelock monitors may not detect.

Indeed, it is believed that a multithreaded pipelined microprocessor system that is arranged to simultaneously monitor and detect livelock situations both in portions of the pipeline and in the pipeline as a whole may be new and advantageous in its own right.

Thus, according to a fifth aspect of the present invention, there is provided a microprocessor system comprising:

a plurality of functional units arranged in a pipelined fashion, one or more of the functional units being operable to receive and process a thread received from the preceding functional unit in the pipeline and to pass a thread after processing to the next functional unit in the pipeline;

means for monitoring the progress of threads through the pipeline as a whole so as to determine whether the system is in a livelock state; and at least one means for monitoring the progress of threads in a particular portion of the pipeline so as to determine whether one or more portions of the system are in a livelock state.

According to a sixth aspect of the present invention, there is provided a method of operating a microprocessor system that includes a plurality of functional units arranged in a pipelined fashion and in which at least one stage in the pipeline can process a thread for execution at the same time as other stages in the pipeline are processing other threads for execution, the method comprising:

monitoring the progress of threads through the pipeline as a whole so as to determine whether the system is in a livelock state; and simultaneously, monitoring the progress of threads in one or more particular portions of the pipeline so as to determine whether one or more portions of the system are in a livelock state.

As will be appreciated by those skilled in the art, these aspects and embodiments of the present invention can and do preferably include any one of the preferred and optional features of the invention described herein as appropriate. Thus, for example, the means for monitoring the progress of threads preferably monitors the complete and/or partial completion of threads. Similarly, the means for monitoring the progress of threads through the pipeline as a whole preferably comprises one or more "top-level" livelock monitors. Meanwhile, the means for monitoring progress of threads in one or more particular portions of the pipeline preferably monitor the partial completion of threads. Similarly, the at least one means for monitoring the progress of the threads in a particular portion of the pipeline preferably comprises one or more "second-level" ("local") livelock monitors as discussed above. These second-level (local) livelock monitors are preferably each associated with one or more caches that are included in or associated with one of the functional units.

In a particularly preferred embodiment, the presence of a livelock situation is detected by counting the number of (execution) cycles between when any of the threads has either complete and/or partial instruction completion. In this case, the number of cycles refers to the number of "active" cycles, i.e. those cycles in which threads are at least attempted to be processed in the pipeline. Then, if there isn't any progress by this measure in a particular, preferably predetermined and/or selected, threshold number of (execution) cycles, it is determined that a livelock situation has been detected.

The number of (execution) cycles between successive cycles at which there is thread progress is then preferably compared to a, preferably predetermined or predefined, threshold number of (execution) cycles to detect (determine) whether a (potential) livelock state has been entered.

The threshold number of (execution) cycles is preferably selected based on the number of functional units (stages) and/or steps in the pipeline arrangement, and may, and preferably will, further vary between the different types of livelock monitor such as the one or more top-level and second-level (local) livelock monitors discussed above. For example, if the pipeline arrangement has 128 pipeline steps, then preferably the threshold number of (execution) cycles used with the one or more top-level livelock monitors is taken as 512 cycles, whilst the threshold number of (execution) cycles used with the one or more second-level (local) livelock monitors is selected from the range of 128 to 390 cycles.

Accordingly, the threshold value used with the one or more top-level livelock monitor (which allow the system to preferably recover from inter-cache livelocks) is preferably greater than the threshold value used with the one or more second-level (local) livelock monitors (which allow the system to preferably recover more efficiently from intra-cache livelocks and near-livelock situations). The Applicants have found, however, that in neither case should the threshold value preferably be set below the number of steps in the pipeline arrangement.

The threshold number of (execution) cycles taken as indicating the entry of the pipeline (or a portion of the pipeline) into a livelock situation, in a particularly preferred embodiment, is varied (e.g. is increased or decreased) after a state of livelock has initially been detected. Most preferably, the threshold number of (execution) cycles is reduced after a livelock state is first detected (following a period when there was not a livelock state). For example, in the exemplary pipeline arrangement of 128 pipeline steps described above, the top-level livelock monitor may use a threshold number of (execution) cycles of 512 in order to detect the initial occurrence of a livelock in the pipeline, but the threshold value is reduced to 256 cycles for the purpose of determining whether the system continues to remain in the state of livelock (as discussed further below). The Applicants have found that this may allow for a more efficient recovery from the livelock state.

The number of cycles between thread progress in this arrangement may be determined as desired. Preferably a counter is used which is incremented each time a cycle passes without the progress of a thread, but which is reset to zero when there is thread progress.

For example, when such a counter is used with the one or more top-level livelock monitors, which monitor the complete and/or partial completion of threads passing through the entire pipeline, the counter is preferably reset to zero when a thread: exits the pipeline (i.e. when the thread is fully processed); or is recirculated back to the beginning of the pipeline following partial processing or in order to begin a new instruction (as discussed in more detail below).

When such a counter is used with the one or more second-level livelock monitors, which monitor the partial completion of threads in one or more portions of the pipeline, the counter is preferably reset to zero following partial processing of the thread by the functional unit to which the livelock monitor relates (is associated with). For example, in the particularly preferred embodiment in which the portion of the pipeline comprises one of the functional units, the counter is reset to zero when a thread is processed in the functional unit.

In another preferred embodiment, the presence of a livelock situation is detected by counting the number of times a cache has a cache-line replaced in a predetermined or predefined period. Then, if this number is greater than a, preferably predetermined and/or selected, threshold value, it is determined that a livelock situation has been entered. Preferably, the period comprises the number of (execution) cycles equal to the number of steps in the pipeline arrangement.

This latter embodiment is particularly applicable to determining intra-cache livelocks (i.e. livelocks within a single cache), and as will be appreciated can be used in addition to, or as an alternative to, the other livelock monitor embodiments discussed above. Indeed, the second-level (local) livelock monitors preferably monitor for livelocks in this way instead or as well.

In the present invention, once a state of livelock is detected, one or more threads in the pipeline are prevented from being able to change the contents of one or more of the caches (the number of threads in the pipeline that are able to change the contents of one or more of the caches is decreased). In other words, one or more of the threads are no longer permitted (no longer have permission to) cause changes in the data stored in a cache or caches (the permission of threads to change data (e.g. have write access to) in the caches is changed). Preferably a plurality of threads are prevented from changing the contents of a cache or caches when a livelock is detected.

In particularly preferred embodiments, the reduction in the number of threads that are able to change the contents of the caches is set according to a predetermined or predefined scheme.

In a particularly preferred embodiment, when a livelock situation is determined to exist, the number of threads with the ability to change the contents of one or more caches is decreased by a predetermined or predefined factor, e.g., and preferably, by a factor of 2 (i.e. the number of threads able to change data in the caches is halved from the current number of threads able to change data). Other arrangements, such as reducing the number of threads able to change the contents of one or more caches by a fixed or variable amount would of course, also be possible.

The Applicants have found that a factor of 2 is of particular benefit when implementing the present invention due to the nature of the binary number system. In particular, using a factor of 2 allows for smaller hardware and a greater system efficiency.

Following a reduction in the number of threads that are allowed to change the data in the one or more caches, and preferably following each such reduction, it is preferably again determined, e.g., and preferably, using any of the methods discussed above, whether the system remains in a livelock state, and, preferably, if the livelock state remains, then preventing further threads from changing the contents of the caches (further reducing the number of threads that are able to change data in the caches). As discussed above, such subsequent determination of whether the system remains in a livelock state after the initial livelock state has been detected preferably uses a lower threshold or thresholds for indicating that the livelock state remains (or has been re-entered).

Accordingly, in preferred embodiments of the present invention, the steps of detecting when the system is in a livelock state and preventing one or more of the threads in the system from changing the data in the one or more caches (if a livelock is detected) are repeated until it is determined that the system is no longer in a state of livelock.

In these arrangements where further reductions in the number of threads able to change the contents of the caches are required because the system remains in a livelock state after a previous decrease in the number of threads, then again the further reduction in the number of threads able to change the contents of the caches is preferably in accordance with any predetermined or predefined scheme for such reductions, such as, again, decreasing the number of threads able to change data in the caches by a given factor (and preferably by a factor of 2 (i.e. such that if n is the number of threads currently able to change data in the caches, then the number of threads able to change data in the caches is reduced to n/2)).

In such an arrangement if a livelock state is detected, the number of threads able to change the contents of the caches would first be reduced by a factor of 2 (halved), and then if the livelock situation remained, the number of threads able to change the contents of the caches would again be reduced by a factor of 2 (i.e. such that a quarter of the original threads would then be able to change data in the caches), and so on.

Preferably the reduction in the number of threads is continued (if necessary) until a, preferably predetermined, minimum number of threads, such as one or four threads, is still able to change the contents of the caches.

It should also accordingly be noted in this regard that the preventing of threads from being able to change the contents of the caches in the manner of the present invention will, preferably, never result in all the threads being prevented from being able to change the contents of the caches. In other words, in the present invention, some, but never all, of the threads will be prevented from changing the contents of the caches when a livelock situation is detected. Similarly, in the present invention, there will always be, in a livelock situation, some threads prevented from changing the contents of the caches but other threads that are still able (allowed) to change the contents of the caches.

It can be seen from the above that the present invention preferably comprises repeatedly detecting whether the system is in a livelock state, and progressively decreasing the number of threads able to change the contents of the caches while the livelock state remains. Similarly, the system preferably periodically determines whether a livelock state exists, and, if it does, then reducing the number of threads able to change the contents of the caches accordingly.

The rate at which the number of threads able to change the contents of the caches is reduced can, as discussed above, be selected as desired, although, as discussed above, halving the number of "allowed" threads each time is preferred.

The particular threads that are prevented from changing the contents of one or more caches when a "livelock" is detected may be selected as desired.

In a particularly preferred embodiment, the "disabled" (blocked) threads are evenly distributed over time, as this has been found to provide more predictable performance. This is preferably achieved by allocating each thread in the pipeline a counter value from a counter going from zero to the total number of threads in the pipeline, and by then selecting the threads to be blocked from changing the contents of one or more of the caches by reversing the order of the bits in the counter value of each thread and comparing the number obtained by reversing the order of the bits to a, preferably predefined or predetermined, threshold value. A thread is then "disabled", or remains "allowed", based on the result of this comparison.

The threshold value is preferably the total number of still "allowed" threads in the system, and if the number obtained for a given thread by reversing the order of the bits in its counter value is less than the threshold value the thread is "disabled" (i.e. prevented from changing the contents of one or more caches), whilst if the number obtained by reversing the order of the bits is greater than or equal to the threshold value the thread remains "allowed" (i.e. able to change the contents of one or more caches). This method has been found by the Applicants to be particularly effective both in terms of speed and efficiency. Other arrangements, however, such as randomly selecting the threads to be blocked would, of course, be possible.

It is similarly preferred to repeatedly and preferably continually monitor whether the system has begun to recover from the livelock state.

This can, e.g., be carried out as the converse of the livelock state detection methods discussed above, such as, for example, and preferably, by determining that the number of (execution) cycles between when any of the threads has either complete and/or partial instruction completion has fallen below a, preferably predetermined, threshold value set for indicating the exiting of a livelock state.

The threshold for the ceasing of the livelock state is preferably set to the same value as the threshold or thresholds used for determining the entering (or re-entering) of the livelock state. However, this need not be the case and, alternatively, for example, some form of hysteresis in respect of the thresholds could be applied, if desired, so that, for example, the system does not continually oscillate between being determined as being in and then recovering from a livelock state.

Once it is determined that the system is no longer in the livelock state, preferably the number of threads that are allowed to change the contents of one or more caches is increased. At this point, the system can be considered to be in a "livelock recovery" state, since "livelock" has ceased and the number of threads able to change the content of one or more caches is being increased again (but the system is not yet fully recovered from the livelock as some of the threads are still blocked).

Accordingly, in particularly preferred embodiments of the present invention, there is further provided means for and a step of allowing one or more threads in the system once more to be able to change the contents of one or more caches once it is determined that the system has begun to recover from being in a state of livelock (i.e. once a state of livelock is no longer detected).

In other words, the system preferably keeps monitoring the progress of the livelock situation, and if it detects an improvement in the situation, it then starts to release threads from their "disabled" or blocked state.

As discussed above in relation to decreasing the number of threads with writing access to the one or more caches, the number of threads is preferably increased according to a particular, preferably, predetermined or predefined scheme. Similarly, the number of threads with the ability to change the contents of one or more caches may be increased by a predetermined or predefined factor and/or by a fixed or variable amount, such as the factor that is used when decreasing the number of "allowed" threads.

Preferably the number of allowed threads is increased periodically (so long as a livelock does not exist). Preferably, it is increased each cycle that there is thread progress.

In a particularly preferred embodiment, the increase in the number of threads with data changing (writing) access during livelock recovery does not follow the same pattern as the thread reduction process, but preferably increases the number of "allowed" threads at a slower rate than the rate at which the number of "allowed" threads is reduced. Preferably the number of allowed threads is increased in a linear fashion (linearly), most preferably by increasing the number of threads allowed to change the contents of the caches by one (at each such increase and, as discussed above, at each cycle when there is not a livelock) (i.e. such that if n is the number of threads currently able to change data in the caches, the number of threads allowed to change the contents of the caches is increased to n+1).

In a similar fashion to that discussed above as the allowed threads are reduced, following an increase in the number of threads that are allowed to change the contents of one or more caches, and preferably following each such increase, it is preferably again determined whether the system has re-entered a livelock state. Accordingly, in preferred embodiments of the present invention, the step of allowing one or more of the threads in the system to change the contents of one or more caches is followed by a step of detecting whether the system is in a livelock state.

If the system is found still to be recovering from the livelock state, then the number of threads permitted to change data in the cache is preferably increased again. This is preferably repeated until (if the system does not re-enter a livelock state) all the threads are restored to being allowed to change the contents of the caches. Again, the rate at which the number of allowed threads is progressively increased can be selected as desired, but it is preferably, as discussed above, a linear increase.

Thus, once the system has begun to recover from the livelock state, the number of threads allowed to change the contents of the caches is preferably progressively (and periodically) increased (subject to checks that a livelock has not re-occurred) (albeit preferably at a slower rate (at each increase) than the reduction in the number of threads allowed to change data when a livelock continues to exist).

On the other hand, should the system re-enter a livelock state as a result of returning writing privileges to one or more of the threads, then the number of threads that are able to change the contents of one or more caches should be reduced again until the system again begins to recover from the state of livelock.

It can be seen from the above, that in the preferred arrangements of the present invention at least, the system will continuously monitor and detect livelocks, and if a livelock has been detected, progressively reduce the number of threads able to change the contents of the caches until such time as the system begins to recover from livelock (i.e. progress of threads is detected again). Then, the system will progressively allow more and more threads to change the contents of the caches until (assuming the livelock situation does not return), all the threads are again able to change the contents of the caches.

The effect of this then is that during a livelock situation, the system of the present invention will effectively "hunt" towards the optimum number of threads able to change the contents of the caches without triggering the livelock situation, and then tend to keep the number of allowed threads at this level while susceptible to the livelock. As will be appreciated, this will tend to keep the system operating at a near optimal, albeit reduced, level of performance during a potential livelock situation, i.e. such that the number of threads that do not have writing access to the one or more caches, and thus that cannot be processed, is not reduced significantly below the level required to recover from the livelock.

As will be appreciated, when recovering from a state of livelock, the system may undergo numerous increases and decreases with respect to the number of threads that are able to change the contents of one or more caches. Indeed, it is believed that a multithreaded pipelined microprocessor system in which the number of threads passing through the system, and which have writing access to one or more caches, is both increased and decreased during its normal operation may be new and advantageous in its own right.

Thus, according to a seventh aspect of the present invention, there is provided a method of operating a microprocessor system that includes a plurality of functional units arranged in a pipelined fashion and in which at least one stage in the pipeline can process a thread for execution at the same time as other stages in the pipeline are processing other threads for execution, one or more of the functional units each including or having associated with it a cache for data to be used by the functional unit when processing a thread, the method comprising:

selectively decreasing or increasing the number of threads of the threads in the pipeline that are able to change the contents of one or more of the caches.

According to an eighth aspect of the present invention, there is provided a microprocessor system for processing a plurality of threads, the system comprising:

a plurality of functional units arranged in a pipelined fashion, one or more of the functional units being operable to receive and process a thread received from the preceding functional unit in the pipeline and to pass a thread after processing to the next functional unit in the pipeline, and one or more of the functional units each including or having associated with it a cache memory for data to be used by the functional unit when processing a thread;

means for decreasing the number of threads of the threads in the pipeline that are able to change the contents of one or more of the caches; and means for increasing the number of threads of the threads in the pipeline that are able to change the contents of one or more of the caches.

As will be appreciated by those skilled in the art, these aspects and embodiments of the present invention can and do preferably include any one or more of the preferred and optional features of the invention described herein as appropriate. Thus, for example, the number of threads with writing access to the one or more caches is preferably decreased if the system is determined to have entered a livelock state, and is preferably increased when the system is determined to have exited a livelock state. Similarly, the rate at which the number of threads is decreased is preferably greater than the rate at which the number of threads is increased.

In a particularly preferred embodiment of the present invention, and in which the pipeline comprises a top-level livelock monitor and one or more second-level (local) livelock monitors, as discussed above, livelock situations can be detected, and thus recovery from the detected livelock situation initiated (e.g. by reducing the number of threads that are able to change the contents of one or more caches in the manner described above), either by the top-level monitor (which monitors progress of threads through the pipeline as a whole) or by the one or more second-level (local) monitors (which monitors the progress of threads through particular portions of the pipeline). In this case, in one preferred embodiment, irrespective of which monitor triggered the livelock situation, the response is, as discussed above, to reduce the number of threads able to change the contents of a cache or caches in the pipeline. Where a livelock situation may be detected and livelock recovery triggered by either a top-level or a second-level (local) monitor, preferably any subsequent control of the system in livelock recovery (livelock analysis), such as detection of re-entering or leaving livelock, etc, is preferably performed, preferably at least initially, using one or other of the livelock monitors (the top-level or the second-level (local)) only, e.g. on the livelock monitor that initially detected the livelock state (triggered the livelock recovery). This helps to avoid the risk of conflicting livelock indications from different livelock monitors causing confusion, e.g. during livelock recovery.

In a preferred embodiment, the manner of recovering from a livelock state detected by the top-level livelock monitor is different from that of recovering from a livelock state detected by one of the one or more second-level (local) livelock monitors. In other words, following a determination that the system has entered a livelock state, the system may, and preferably does, enter a "system recovery" mode of operation if the livelock was detected by the top-level livelock monitor or a "local recovery" mode of operation if the livelock was detected by one of the one or more second-level (local) livelock monitors.

As will be appreciated, two or more portions of the pipeline arrangement may be determined to be in a state of livelock by the associated second-level (local) livelock monitors at the same time. For example, if each second-level (local) monitor is associated with a particular functional unit, which in turn is associated with one or more caches, then a first functional unit may be determined as being in a livelock state (e.g. intra-cache livelock) at the same time (concurrently) as a second functional unit is determined as being in a (unrelated) livelock state. Accordingly, different portions of the pipeline arrangement may be in "local recovery" modes of operation at the same time.

"System recovery" and "local recovery" may also occur concurrently in embodiments of the present invention. Preferably, however, the system will only ever be in one of the recovery modes at any particular time, i.e. if the system is determined to be in a state of livelock, then either one or more portions of the pipeline will be undergoing local recovery, or the pipeline as a whole will be undergoing system recovery. This may help to prevent the occurrence of conflicting instructions arising in the system that may occur if both recovery modes were in operation at the same time.

In a particularly preferred embodiment, typically a livelock will be detected first by one or more of the second-level (local) livelock monitors, and thus one or more portions of the pipeline will typically be in a local recovery mode before a livelock is detected by the top-level livelock monitor and the pipeline subsequently enters the system recovery mode. However, once the pipeline enters the system recovery mode, any local recovery occurring in the pipeline is preferably stopped. (As will be appreciated, it should not be, and preferably is not, necessary to retain any information concerning the status of the one or more portions of the pipeline undergoing local recovery at the time when system recovery is triggered. This is because, typically, the livelock situation(s) that initially triggered the local recovery in the one or more portions of the pipeline should be, and preferably are, resolved by the subsequent system recovery.)

In these arrangements, system recovery (triggered by the top-level livelock monitor) is preferably implemented, as described above, by preventing one of more of the threads passing through the system from being able to change the contents of one or more caches, and preferably all of the caches, in the pipeline.

Local recovery may be, and preferably is, similarly implemented by preventing one of more of the threads from being able to change the contents of a cache or caches in a similar manner, but only for the cache or caches associated with the particular portion of the pipeline in which livelock was detected. Thus in local recovery, the threads are preferably only prevented from changing the contents of the particular cache or caches associated with the portion of the pipeline in which the livelock is detected, and not the contents of caches in other portions of the pipeline. Preferably multiple local recovery modes are allowed to occur simultaneously in the pipeline. This should be possible as there preferably should be no interference between the individual recovery modes.

In another embodiment, local recovery may also or instead be implemented by selectively ignoring one or more cache-misses in the cache in question when they occur. This, as will be appreciated, effectively achieves the same result as reducing the number of threads with writing access to the cache.

When two or more portions of the pipeline are undergoing local recovery at the same time as discussed above, the local recovery method used in each case may be the same, or it may be different. For example, both local recovery modes could be implemented by reducing the number of threads that are able to change the contents of the related cache or caches, but with each mode using a different threshold number of (execution) cycles to determine whether the portion of the pipeline remains in a state of livelock. Alternatively, a first local recovery mode could be implemented by reducing the number of threads that are able to change the contents of the related cache or caches, and a second local recovery mode could be implemented by the related cache or caches selectively ignoring cache misses.

As will be appreciated from the above, it will be necessary in the arrangements of the present invention to indicate whether a respective thread is able to or is prevented from changing the contents of the cache or caches. This may be done to any desired and suitable manner.

In a particularly preferred embodiment, threads have associated with them data or information for indicating this. Thus, in a particularly preferred embodiment, one, some, and preferably all of the threads passing through the pipeline arrangement and/or one or more functional units have associated with them information indicating whether the thread is able to change the data in the one or more caches of the system. The information may comprise, for example, and preferably, one or more tags and/or flags that can be set to indicate that a thread has permission to change the contents of a cache or not.

The one or more functional units accordingly preferably comprise means, such as a processor, for reading (assessing) information associated with a thread indicating whether the thread is able to change the contents of one or more caches of the system, such that the one or more functional units and/or a cache associated with or included in one or more of the functional units can deny or allow the thread access to change the contents of the cache, as appropriate.

There is accordingly also preferably provided means for and a step of changing the information associated with a thread indicating whether the thread is able to change the contents of one or more caches of the system. In other words, means are preferably provided, e.g., and preferably in or for each respective functional unit, for changing the "permission" information associated with a thread, e.g., such that a thread which previously was able to access and update the data in the one or more caches is changed such that it is now no longer able to, or vice versa.

The mechanism for changing the information may be of any suitable or desired form, and may be positioned at any suitable location in the pipeline arrangement. For example, this process may be associated with or included in one or more of the functional units of the system, preferably either the start or end functional unit. Alternatively, the changing of the threads' permissions information (setting) may be associated with or included in an additional functional unit (i.e. a unit that is not used to process the threads passing through the system). This "non-processing" functional unit can be positioned at any stage in the pipeline between the start and end functional units, but preferably is located either before (upstream of) the start functional unit or after (downstream of) the end functional unit.

Alternatively, a list of the threads that are (or are not) permitted to change data in the caches could be maintained, and, e.g., checked by a functional unit or units to deny or allow the thread access to change the data stored in the cache, accordingly. In this case, when livelock is detected, the list of threads should be suitably updated to reflect which of the threads passing through the system are now able change the data stored in the one or more caches.

In a further embodiment, the process for selecting the threads to be blocked, e.g. such as that discussed above (reversing the order of bits in a counter going from zero to the total number of threads in the pipeline and comparing the number obtained by this reversal to a threshold value), can be performed directly in each of the one or more functional units. In other words, and for example, the counter going from zero to the total number of threads could be "sent" directly to the functional unit, with the counter being adjusted to take account of the position of the functional unit in the pipeline (e.g. subtracting the clock-cycle delay between where the clock originated and the functional unit). Then, the order of the bits forming the adjusted value in the counter could be reversed and resultant number compared to the total number of still "allowed" threads so as to determine whether the thread should be entitled to writing access to the cache. This embodiment, as will be appreciated, reduces the number of registers needed in the system when compared, for example, to the above embodiment in which information, e.g. in the form of a tag and/or flag, indicating whether a thread is able to change the contents of one or more caches of the system is associated with each of the threads.

It is believed that a functional unit of a multithreaded pipelined arrangement arranged to operate in the above described manner may be new and advantageous in its own right.

Thus, according to a ninth aspect of the present invention, there is provided a functional unit for use in a microprocessor system that includes a plurality of functional units arranged in a pipelined fashion and in which one or more of the functional units can process a thread for execution at the same time as other functional units in the pipeline are processing other threads for execution, one or more of the functional units including or having associated with it a cache for data to be used by the functional unit, the functional unit comprising at least one of:

means for determining whether a thread is either permitted or prevented from changing the contents of one or more caches; and means for changing information associated with one or more of the threads that are passed down the pipeline for execution indicating whether the thread is either permitted or prevented from changing data in one or more of the caches.

According to a tenth aspect of the present invention, there is provided a method of operating a microprocessor system that includes a plurality of functional units arranged in a pipelined fashion and in which one or more of the functional units can process a thread for execution at the same time as other functional units in the pipeline are processing other threads for execution, one or more of the functional units including or having associated with it a cache for data to be used by the functional unit, the method comprising at least one of:

determining whether a thread is either permitted or prevented from changing the contents of one or more caches; and changing information associated with one or more of the threads that are passed down the pipeline for execution indicating whether the thread is either permitted or prevented from changing the contents of one or more caches.

As will be appreciated by those skilled in the art, these aspects and embodiments of the present invention can and do preferably include any one or more of the preferred and optional features of the invention described herein as appropriate. Thus, for example, the functional unit can be positioned at any suitable location in the pipeline arrangement, but is preferably arranged either at the beginning or end of the pipeline (e.g. forming a start or end functional unit). Similarly, the functional unit may comprise a functional unit for processing threads passing through the pipeline or alternatively may comprise a separate functional unit that does not process threads passing through the pipeline.

In use of these aspects and embodiments of the invention, and as discussed above, either the information associated with one or more of the threads indicating whether the thread is permitted or prevented from changing the contents of the one or more caches is changed and/or it is determined whether one or more of the threads is permitted or prevented from changing the contents of one or more caches. In other words, a thread that was previously permitted to cause the one or more caches to request, and be updated with, data from other memory in the system is changed and/or determined by the functional unit to be a thread that is now prevented from doing so. Similarly, a thread that was previously prevented from causing the one or more caches to request, and be updated with, data from other memory in the system is now permitted to do so.

When, in accordance with embodiments of the present invention, a thread is prevented from being able to change the contents of a cache or caches, then the thread can be restricted in that regard in any desired and suitable manner. The thread should at least be prevented from being able to cause new data (for processing the thread) to be written into the cache (prevented from being able to fill a cache line) (since that could cause the overwriting of data already in the cache).

However, in a particularly preferred embodiment, the thread is prevented from being able to trigger any action that could risk new data being written into the cache. Thus in a particularly preferred embodiment, as well as being prevented from being able to trigger the fetching and writing of new data into the cache, any thread that is "blocked" in accordance with the present invention is also prevented from being able to update one or more of, and preferably all of, the cache parameters, registers and/or lists that could also affect the writing of data into the cache.

Thus, for example, and preferably, a blocked thread is prevented from being able to update the mechanism that tracks when each cache line was last accessed, and which therefore indicates which of the cache-lines is the least recently used line (LRU-line) of the cache (such as an "LRU-list"). This is desirable, since if a blocked thread could still update the LRU tracking information of the cache, then this could result in a situation where multiple cache-lines are needed but the data is instead written to the same cache line over and over again due to the changes in the LRU tracking information.

For example, an "allowed" thread-group (i.e. multiple "allowed" threads that are each required to be successfully processed at the same time in order for the thread-group to be processed), as will be appreciated, may require a number of cache-lines in a particular cache equal to the number of threads in the thread-group in order to be processed. Each time, a thread of the thread-group experiences a cache miss, the data required to process the thread is fetched and stored on the LRU-line as is known in the art. If the "blocked" (disabled) threads are permitted to update the LRU tracking information, then this could cause the LRU tracking information to indicate that the LRU-line is one of the cache-lines required by one or more of the threads of the thread-group. Accordingly, this cache-line will be continually over-written, and the threads of the thread-group will never be able to be processed (have a cache hit) simultaneously as is required for the thread-group to progress.

However, by preventing the blocked (disabled) threads from being able to update the LRU tracking information, or in other words by only permitting the allowed threads to update the LRU tracking information, this problem can be avoided as each allowed thread will not cause the cache-lines required by other allowed threads to be overwritten once the number of allowed threads falls below (or is equal to) the number of cache-lines in a particular cache.

Similarly, therefore, in a preferred embodiment, any thread that is blocked from changing the contents of the caches is also prevented from being able to change any cache information that could cause other cache-lines to be overwritten.

Most preferably, blocked threads are not allowed to do any operation that could affect the cache state, and/or to change the state of the cache in question at all.

Where caches in the pipeline have locking mechanisms (e.g. such that the cache can be locked down to reserve space in the cache (a cache line) for future use), then the threads that are blocked from changing the contents of the caches in the manner of the present invention are not only prevented from being able to update (write to) the least recently used line (LRU-line), but are also preferably prevented from being able to read (get a hit on) the LRU-line of the cache. This is to prevent deadlocks occurring where the LRU-line needs to be filled and at the same time is locked.

For example, one exemplary locking mechanism for a cache is that a cache-line is locked down for a number of (execution) cycles following a hit on the line. This is to ensure that the cache-line remains constant (i.e. not be written to) so that the data on the line can be read out over several (execution) cycles. In this situation, however, if each of the cache-lines can be read by one or more threads, potentially each of the cache-lines could have a hit within a certain period (i.e. a particular number of (execution) cycles) thereby causing all of the cache-lines to be locked at the same time. Accordingly, the "allowed" threads that still have writing access to the cache will be unable to change the contents of the cache even though they are permitted to do so. In other words, a deadlock situation can arise.

Thus, in preferred embodiments of the present invention, when the system is recovering from a livelock situation (i.e. when one or more of the threads in the system are "disabled" (blocked)), the "blocked" (disabled) threads are prevented from reading the LRU-line such that, at least, the LRU-line will always be available to the "allowed" threads for writing purposes. Therefore, the above described deadlock situation can be avoided.

It would also be possible to prevent any threads that are prevented from changing the contents of the caches from also being able to read (query) the caches. However, in a particularly preferred embodiment this is not done. Thus, in a particularly preferred embodiment, any threads that are prevented from being able to change the contents of the caches in accordance with the present invention are still able to read or query the caches (i.e. can still access the data already in the caches and get a cache "hit" (if the data is present)).

In other words, the threads are preferably only blocked from write access for the caches, and are still permitted read access to the caches. This allows any "blocked" thread still to be executed if the data it requires is already present in a cache, and will therefore increase the level of performance as compared to if the thread was blocked from read access as well.

It should also be noted here that, for the avoidance of doubt, any thread that is prevented from being able to change the contents of a cache or caches in the manner of the present invention is (preferably) still permitted to, and, indeed, will, continue its progress through the pipeline (i.e. it is not stalled or ejected from the pipeline). Similarly, where the processing of such a blocked thread does not require access to cached data, then that processing of the thread can still be, and is preferably, carried out as normal.

As discussed above, in the present invention, threads are, in effect, selectively prevented from being able to change the contents of one or more caches of the pipeline. As discussed above, in some cases the threads are blocked from being able to change the contents of only particular or selected caches in the pipeline (for example where it is known that particular caches are particularly susceptible to livelock situations arising and/or if there is a "local" recovery situation).

In one preferred embodiment, any thread that in accordance with the present invention is prevented from being able to change the contents of a cache, is prevented from being able to change the contents of all of the caches associated with or of the pipeline arrangement, preferably at least in "system" recovery. Thus, in one particularly preferred embodiment, when a thread is prevented from changing the contents of one or more of the caches, it is prevented from changing the contents of all of the caches.

The pipeline arrangement of the present invention can take any suitable and desired form. It should comprise, as is known in the art, a plurality of functional units or stages arranged in a linear (series) fashion (i.e. such that a thread exiting from one functional unit subsequently enters the next function unit in the pipeline et seq). Preferably, therefore, the pipeline will comprise a start functional unit, an end functional unit, and one or more intermediate functional units positioned therebetween.

Each stage or functional unit of the pipeline will typically be and preferably is, and arrangement that performs a particular function and gives an output based on the input it receives. Each stage or functional unit may include and preferably does include a plurality of steps that together perform the function in question. Where a stage (functional unit) includes multiple pipeline steps, then the stage can preferably contain a plurality of threads simultaneously (e.g., and preferably, one thread per pipeline step).

In a preferred embodiment, the pipeline arrangement of the present invention is arranged such that if a thread cannot be processed by a particular functional unit of the pipeline, e.g. because data required for processing the thread is not present in a cache included in or associated with the functional unit, the thread is passed to the next stage of the pipeline without being processed. Effectively, this stops a "failed" thread (i.e. a thread that is not processed in the pipeline or has only been partially processed in the pipeline) from blocking the pipeline whilst the cache requests data from other memory in the system in order to process the thread.

Similarly, any threads that reach the end of the pipeline without being fully processed are preferably returned (recirculated) to the beginning of the pipeline, preferably immediately, to be passed along the pipeline again (i.e. for a second, third or more times). The "flow" of threads through the pipeline is therefore preferably unidirectional from the beginning of the pipeline to the end of the pipeline.

(It should also be noted that where a given thread does not need to be processed by each of the functional units in the pipeline, then the thread preferably still proceeds along the pipeline in the manner described above, but will only be processed by those functional units that apply to the particular thread in question.)

In a preferred embodiment, a given thread can be recirculated through the pipeline a number of times to be repeatedly processed by the pipeline. In this case, the thread in the pipeline will "carry" with it the instructions to be performed on its current pass (and if necessary subsequent passes due to cache misses, etc) through the pipeline. The thread will then be recirculated to pass through the pipeline again (following completion of the original set of instructions), but this time with a new set of instructions.

The start functional unit of the pipeline is preferably arranged to: receive one or more threads for processing, said one or more threads comprising either one or more new threads that have not passed through the pipeline before and/or one or more failed threads that are being recirculated through the pipeline for a second, third or more times; process said one or more threads; and output said one or more threads (following successful or failed processing) to the next functional unit in the pipeline. Any failed thread that has been recirculated back to the start functional unit preferably takes preference over a new thread that is awaiting processing and is reintroduced into the pipeline before any such waiting new threads.

The one or more intermediate functional units of the pipeline are preferably arranged to: receive one or more threads for processing from the previous functional unit; process said one or more threads; and output said one or more threads (following successful or failed processing) to the next functional unit in the pipeline.

The end functional unit is preferably arranged to: receive one or more threads for processing from the previous functional unit in the pipeline; process said one or more threads; and output said one or more threads (following successful or failed processing) either to a given output target, such as a memory, when a thread has been fully processed, or to the start functional unit when a thread has not been processed or only partially processed.

For all the functional units of the pipeline, as discussed above, the threads preferably step down one pipeline step of the functional unit upon each (execution) cycle of the pipeline (e.g., and preferably, such that at each (execution) cycle of the pipeline, the first pipeline step of the functional unit will receive a thread, and the last pipeline step of the functional unit will pass a thread to the next functional unit for the start of the next (execution) cycle, and so on). Any intermediate pipeline step in the functional unit similarly preferably process any threads they have at an given cycle and then pass the thread to the next pipeline step.

The pipeline arrangement of the present invention may include as many pipeline steps as is desired. However, the Applicants have found that the present invention is particularly applicable to relatively long pipeline arrangements, and thus in a preferred embodiment there are at least 32, preferably at least 64, and most preferably at least 128 steps in the pipeline. In one preferred embodiment, the pipeline comprises 128 pipeline steps.

Similarly, the pipeline includes a plurality of functional units and may include as many functional units as is desired. As discussed above, each functional unit may and preferably does include a plurality of pipeline steps. Thus, for example, the number of functional units is preferably commensurate with there being 128 pipeline steps.

The microprocessor pipeline can be for and take the form of any suitable pipeline microprocessor arrangement. Similarly, the functional units (pipeline stages) can accordingly be any appropriate and suitable functional units (and comprise, for example, appropriate processing logic) for the pipeline arrangement in question. For example, the present invention could be applied to and/or comprise a dsp (digital signal processor) arrangement, or an ordinary CPU arrangement that supports lots of threads.

The caches (cache memories) in the system of the present invention can similarly be any suitable and desired such memory. As will be appreciated by those skilled in the art, the reference to caches and cache memories herein is intended to refer to a form of "local", more quickly accessible, memory that is distinguished in particular from the main and/or external memory of the microprocessor system, such as, for example, the main "host" memory.

Similarly, the data that is stored in the caches and used for processing the threads may be any desired and suitable such data. Thus it may comprise, for example, data values for particular parameters, or it may comprise program instructions and program steps for programs to be executed on threads by the corresponding functional unit.

As discussed above, the Applicants have found that the present arrangement is particularly applicable in systems where there are plural caches and a large number of running (active) threads, and in which each thread is capable of causing each of the caches to refill with different content, and cache-hits in multiple caches are required for a single thread to complete (as in these circumstances the livelock situation identified by the Applicants may be more likely to occur).

Similarly the present invention is particularly applicable to constrained systems where the size of the cache or caches is small relative to the number of running (active) threads. Thus in preferred embodiments, the present invention is implemented in and/or comprises microprocessor arrangements of these forms.

In a particularly preferred embodiment, the pipeline arrangement is a graphics processing, preferably a 3D graphics processing, pipeline. In one preferred such embodiment, the pipeline arrangement is a graphics rendering pipeline arrangement. In a particularly preferred embodiment, the pipeline arrangement is a pipelined microprocessor arrangement for carrying out graphics fragment (pixel) shading programs and processes. As is known in the art, graphics processing can involve the application of various shading programs to graphics fragments to provide the relevant data for display of the fragment. This is commonly referred to as "fragment shading" or "pixel shading", and a pipelined series of microprocessor functional units in the manner of the present invention can preferably be used to execute the fragment shading program(s) on fragments for rendering.

Similarly, the functional units of the pipeline are preferably graphics, preferably 3D graphics, processing units, and in one preferred embodiment are rendering units of a graphics processing pipeline, such as: a function generator or generators; a texture mapper or mappers; a blender or blenders; a fogging unit or units; logic operation units; and/or a fragment (pixel) shader unit or units.

The threads that are processed by the microprocessor pipeline can similarly take any suitable and desired form. They may, for example, comprise instruction threads for execution or data threads for processing, etc. The threads may, for example, have data, or program instructions, or both, associated with them.

In a particularly preferred embodiment, and as discussed above, the threads represent graphics fragments for processing. In this case, the fragments may have data associated with them (such as colour data (RGB values), transparency data (an alpha value), position data (x, y), texture coordinates (s, t), etc.) and/or may have program instructions associated with them (such as pixel (fragment) shader program instructions). Each thread may, for example, represent a single fragment (x, y position) or may represent a group of fragments (x, y positions), such as, and preferably, a 2×2 block of fragments.

It will be appreciated from the above that there preferably will be a plurality of threads passing through the pipeline at any one time. In a particularly preferred embodiment, the number of threads in the pipeline can be, and preferably is, equal to the number of pipeline steps. In other words, there is preferably one thread in the pipeline for each step of the pipeline, i.e. such that the pipeline is "full" of threads. Thus, in one preferred embodiment, the pipeline has 128 steps, and there are therefore 128 threads in the pipeline at any given time (while the pipeline is in use). The use of a relatively long pipeline with a matching number of threads helps to ensure that a relatively high throughput of threads from the pipeline can be maintained, notwithstanding that some threads may "fail".

The present invention can be used in and for and comprise any suitable and desired pipelined microprocessor arrangement, such as, for example, general CPU arrangements. Preferably, however, the present invention is implemented in and for a (3D) graphics processing system. Similarly, the present invention extends to and includes a (3D) graphics processing system that includes or comprises the system of the present invention, and a method of operating a (3D) graphics processing system that includes the methods of the present invention.

The methods in accordance with the present invention may be implemented at least partially using software e.g. computer programs. It will thus be seen that when viewed from further aspects the present invention provides computer software specifically adapted to carry out a method or the methods herein described when installed on data processing means, a computer program element comprising computer software code portions for performing a method or the methods herein described when the program element is run on data processing means, and a computer program comprising code means adapted to perform all the steps of a method or of the methods herein described when the program is run on a data-processing system. The data processing system may be a microprocessor system, a programmable FPGA (Field Programmable Gate Array), etc.

The invention also extends to a computer software carrier comprising such software which when used to operate a pipelined microprocessor arrangement comprising data processing means causes in conjunction with said data processing means said arrangement to carry out the steps of a method or of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of a method or of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A preferred embodiment of the present invention will now be described by way of example only and with reference to the accompanying drawing, FIG. 1, which shows schematically an exemplary pipelined microprocessor arrangement.

The microprocessor pipeline arrangement 1 shown in FIG. 1 includes a plurality of pipeline stages or functional (processing) units $P_1, P_2, P_3, \ldots, P_N$, arranged in a linear, series fashion, one after another. Each functional unit will, as is known in the art, include a plurality of pipeline steps, and in the present embodiment, each step can "have" a thread in it at any given time.

A number of the functional units $P_1, P_2, P_3, \ldots, P_N$ have access to a respective cache memory $C_1, C_3, C_N$ from which it can retrieve data needed to process threads that pass through the pipeline. The individual cache memories $C_1, C_3, C_N$ are in communication with other memory 3 in the system from which additional data can be requested and fetched should it be required in order for the associated functional unit to process one or more of threads that pass through the system. It should be particularly noted that not every functional unit in the pipeline of the present embodiment has access to a cache memory, although the present invention does encompass arrangements in which all of the functional units have access to a cache memory.

As shown in FIG. 1, the first functional unit $P_1$ in the pipeline can receive threads for processing from an external source 5, and the end functional unit $P_N$ of the pipeline can output processed (completed) threads to an output target 7.

The pipeline arrangement 1 shown in FIG. 1 also includes a loopback or return path 9, via which threads can be returned from the end of the pipeline to the beginning of the pipeline for sending through the pipeline again. This operation will be discussed in more detail below.

As will be appreciated by those skilled in the art, although FIG. 1 only shows a small number of functional units in the pipeline 1 for clarity, in practice there may be many more functional units in the pipeline. A preferred embodiment of the present invention is for there to be 128 pipeline steps.

It should similarly be noted that not every functional unit (pipeline stage) need have access to a cache memory. There may be some functional units (pipeline stages) that do not require cached data, for example, the functional unit $P_2$ does not have access to a cache.

In its basic operation, the pipeline arrangement shown in FIG. 1, will, as is known in the art, receive a series of threads for processing from the source 5, and each thread will progressively step down the pipeline stages (functional units), so that, in effect, all the threads pass through the pipeline stages (functional units) one after another and are appropriately processed thereby. Once a thread reaches the end functional unit $P_N$, then, if its processing has been completed, and it can otherwise be allowed to exit the pipeline, upon the next execution cycle it is sent to the output target 7.

Thus, upon each execution cycle of the pipeline, the functional unit $P_2$, for example, will receive a thread for processing from the preceding functional unit $P_1$, and output a thread to the next functional unit $P_4$ in the pipeline, and so on, as is known in the art. In practice threads will pass to the next step of the pipeline upon each pipeline execution cycle.

The microprocessor pipeline 1 in the present embodiment is a graphics processing pipeline, and in particular a processing pipeline for carrying out fragment shading programs (i.e. for shading (rendering) graphics fragments).

This being the case, the functional units in the pipeline comprise processing units that are each able to perform particular program steps on threads (fragments) that they receive. The necessary program steps are stored in the respective caches of the functional units, and each thread (fragment) carries with it a set of program instructions that indicates which program steps each functional unit is to perform on the thread (fragment). (This arrangement is possible for graphics processing, because in a graphics processing arrangement typically each thread (fragment) will have the same program steps executed on it, and the programs in themselves will be relatively short. This allows the necessary programs to be held in the caches associated with the functional units, and for the relevant program steps to be triggered by associating a short set of program instructions with each thread (fragment).)

Thus, in the present embodiment, the "threads" that are sent through the pipeline 1 comprise an instance of the program that a graphics fragment for rendering is executing. The threads accordingly, preferably have associated with them, for example, graphics data, such as colour, and position data, and also, as discussed above, a program instruction pointer or pointers indicating the program steps to be executed by the functional units on the graphics fragment.

In a particular preferred embodiment, each fragment has a set of (e.g. 6) four-component registers that can be read/written by the functional units, an instruction pointer and a stack pointer, temporary data stores for texture lookups (for partial texture progress), a renderer state index, a primitive (polygon) data word index, fragment position (x, y) data, a destination buffer ID, and a primitive index (age value).

In the present embodiment, the threads are sent through the graphics pipeline as groups of 2×2 blocks (quads) of threads (representing 2×2 quads of graphics fragments (fragment x, y positions), with each thread in the quad being dependent in some way on the other threads of the quad.

As is known in the art, when a thread is to be processed by a given functional unit and that processing requires data stored in a cache associated with a functional unit, it can be the case that the relevant data is not available in the cache at the time that it is needed to process the thread. This situation is referred to as a "cache miss".

In the present embodiment, and in accordance with the present invention, if such a cache miss occurs, the processing of threads in the pipeline is not blocked, nor is the thread immediately removed from the pipeline at the point that it has failed. Instead, the thread is simply allowed to continue through the pipeline to the next pipeline step (and thus, in time, to the next functional unit (pipeline stage), and so on). In this way, any threads that cannot be processed do not "block" the pipeline, but instead simply continue to pass through the pipeline in the normal manner.

As discussed above, the pipeline 1 includes a loopback path 9 that can return to the beginning of the pipeline for sending through the pipeline again, threads (fragments) that have not completed their processing when they reach the end of the pipeline (e.g. because they encountered a cache miss and so could not be processed by a functional unit on their way through the pipeline). In this way, any threads that have not completed their processing on passing through the pipeline can be sent through the pipeline again to allow the processing of the thread to be completed.

In the present embodiment, each thread is provided with a completeness identifier indicating whether a thread has failed to be processed by one of the functional units in pipeline. For example, each thread has associated with it a "failed" bit. This bit is unset at the start of the pipeline, but can be set by each of the functional units $P_1, P_2, P_3, \ldots, P_N$ if the processing at the particular functional unit fails (e.g. because of a cache miss). This "failed" bit therefore indicates whether a thread has failed to be processed by at least one of the functional units on its passage through the pipeline.

Each thread also has associated with it a "completed" bit. This bit is set if all the functional units in the pipeline have succeeded in their processing of a thread.

The end functional unit $P_N$ in the present embodiment, or an additional functional unit in other embodiments, comprises means for detecting and assessing the state of the "failed" and "completed" bits in each of the threads, i.e.

whether the bits are set or unset. Thus, the end functional unit $P_N$ can direct each thread according to the state of "completed" bit either to exit the pipeline (if the flag is set and no further processing is required) or to the return path 9 for recirculation back to the beginning of the pipeline (if the flag is unset and more processing of the thread is needed). Similarly, the end functional unit will return a thread to the beginning of the pipeline via the return path 9 if the "failed bit" is set thus indicating that a process for the thread has failed.

Operating the pipeline arrangement in the manner described above can, however, lead to the system entering a state known as "livelock". For example, if a first thread experiences a cache miss at one of the caches in the system, e.g. $C_3$, and a second subsequent thread similarly experiences a cache miss at the same cache, then the cache $C_3$ will request and obtain the data required to process this second thread and in so doing may overwrite the data needed to process the first thread. If this happens, then, when the first thread again arrives at the functional unit $P_3$, the cache $C_3$ will still not contain the data needed to process the thread, and the thread will again be passed unprocessed and the cache $C_3$ updated. Similarly, the second thread also may not be able to be processed by the functional unit $P_3$ (as now the first thread's data is in the cache), and so the cache $C_3$ will again be updated, and so on.

The above described "livelock" situation is an example of an intra-cache livelock in which the livelock originates in (is confined to) a single cache. The pipeline arrangement may, in addition, experience inter-cache livelocks which arise as a result of the (conflicting) interaction of two or more caches, and also situations commonly referred to as "near-livelocks" in which caches experience a large degree of cache trashing causing a dramatic increase in the memory bandwidth of the system and thus a decrease in the performance of the system.

In order to determine when the system has entered a livelock situation (such as those described above), the pipeline arrangement 1 includes a number of livelock monitors $M_1$, $M_3$, $M_T$.

$M_T$ is a top-level livelock monitor, which is used to detect livelock situations in the pipeline as a whole, and is thus able to monitor for any livelock situation that may arise, such as each of the livelock situations described above, i.e. inter-cache livelocks, intra-cache livelocks and near-livelock situations. The top-level monitor $M_T$ is positioned at the end of the pipeline, downstream of the last functional unit $P_N$. In other embodiments, however, the top-level monitor may be positioned at the start of the pipeline, upstream of the first functional unit $P_1$.

$M_1$ and $M_3$ are second-level (or local) livelock monitors, which in the present embodiment are associated with the individual caches $C_1$ and $C_3$. These local monitors, whilst not able to detect the occurrence of inter-cache livelocks, are able to determine when intra-cache livelock or near-livelock situation arise in their associated caches and substantially quicker than is possible using only the top-level livelock monitor $M_T$ (particular if the program being executed by the threads is relatively large). This is because the top-level livelock monitor $M_T$ monitors the progress of all the threads in the pipeline, and so a livelock situation is only detected when all of the threads of the pipeline are affected. In contrast, the local livelock monitors $M_1$, $M_3$ only monitor those threads that use the respective cache $C_1$, $C_3$ to which the local monitor is associated. Thus, the local livelock monitors $M_1$, $M_3$ will detect a livelock situation affecting only the threads using the respective caches $C_1$ or $C_3$ substantially before the top-level livelock monitor $M_T$ as typically there will be at least some threads in pipeline (e.g. those threads that do not use the caches $C_1$ or $C_3$) which continue to be processed.

In the present embodiment, the livelock monitors determine whether the system has entered a livelock state by monitoring the progress (or not) of threads through the pipeline.

In order to do this, the local livelock monitors $M_1$ and $M_3$ count the number of active execution cycles between which there is progress in (processing of) any of the threads passing through their respective associated functional units $P_1$ and $P_3$, and compare this number to a threshold value. For example, in a pipeline arrangement of 128 steps, the threshold value is selected to be in the range of 128 to 390 cycles.

Similarly, the top-level livelock monitor $M_T$ counts the number of active execution cycles between which there is progress in (processing of) any of threads passing through the pipeline, and again compares this to a threshold value. This progress includes the completion of any instructions, and thus includes threads which are fully processed (and which are able to exit the pipeline) and threads which are partially processed by one of the monitored functional units. As shown in FIG. 1, the top-level monitor $M_T$ is therefore in direct communication 10 (communications passed outside of the pipeline) with each of the functional units $P_1$, $P_3$ that have associated local livelock monitors $M_1$, $M_3$. The top-level threshold value, for example in a pipeline arrangement of 128 steps, is selected to be 512 cycles.

If there is no progress of threads whatsoever in these threshold numbers of cycles, then it is determined that the pipeline is in a livelock state (i.e. a livelock has been detected).

Typically, a livelock (a near-livelock situation or an intra-cache livelock) will be detected first by the local monitors $M_1$, $M_3$. Once detected, the system attempts to recover from the livelock by ignoring cache-misses (so that the cache is not filled faster than it can be read) or by reducing the number of threads that have writing access to the respective cache $C_1$, $C_3$ by a factor 2. As will be noted, all the threads that do not use either of the caches $C_1$ or $C_3$ remain unaffected by the triggering of recovery from the detected livelock state so as to maintain the optimal performance level of the system.

It is then determined whether the livelock state remains following this change using the detection techniques described above. If the system is determined to remain in a state of livelock, a greater number of cache-misses are ignored or the number of allowed threads is again decreased by a factor of two, and the state of livelock reassessed. This process continues until the functional unit is no longer determined to be in livelock (and the recovery process effectively reverses as described below), or until the top-level livelock monitor determines that the pipeline has entered a livelock state.

When the top-level monitor $M_T$ determines that the system has entered livelock, the local monitors are disabled (and thus any recovery at the local level stopped) in order to avoid any conflicts, and the number of threads that have writing access to the caches $C_1$, $C_3$, $C_N$ ("allowed" threads) is reduced by a factor of two.

It is then determined whether the livelock state remains following this change using the detection techniques described above for the top-level livelock monitor $M_T$. If the system is determined to remain in a state of livelock, the number of allowed threads is again decreased by a factor of two, and the state of livelock reassessed. This reduction continues until only a single allowed thread is passing through the pipeline arrangement or until, at an earlier stage, the system is determined to no longer be in livelock.

Following a determination that the system is no longer in livelock state, the number of blocked threads is steadily decreased, i.e. the blocked threads are gradually changed to allowed threads. In the present embodiment, the number of blocked threads is increased by one, and the system is reassessed after every execution cycle to determine whether it has re-entered livelock (whether there has been progress in any of the threads) following the increase in allowed threads. If the system does not re-enter a state of livelock, the number of allowed threads continues to be increased by one, and so on, until all the threads passing through the system are once again given both reading and writing access to the various caches $C_1, C_3, C_N$.

However, if it is determined that the system has again entered a state of livelock before the number of blocked threads in the pipeline arrangement is reduced to zero, then the number of allowed threads will again be reduced in the manner described above.

The person skilled in the art will therefore appreciate that, in use, the number of blocked threads passing through the pipeline arrangement of the present embodiment will continually vary, increasing and decreasing at various times as the system enters and tries to recover from livelock.

In the present embodiment, the threads to be blocked from updating the caches $C_1, C_3, C_N$ are selected by allocating each thread in the pipeline a counter value from a counter going from zero to the total number of threads in the pipeline. The order of the bits in the counter value of each thread is then reversed and the number obtained compared to a threshold value equal to the number of still allowed threads in the system. If the number obtained for a thread from reversing the order of the bits is greater than or equal to the threshold value, then the thread is selected and blocked, but if it is less than the threshold value, then the thread is passed and retains its writing access. This allows for an even distribution of allowed threads over time and along the pipeline. An example of this process is provided below for a 4-bit counter with a threshold value of 4, i.e. four threads are still to be allowed "write access".

| Linear ==> Reversed | Result |
|---|---|
| 0 = 0000 ==> (0000 = 0) | <4, passed |
| 1 = 0001 ==> (1000 = 8) | >4, failed |
| 2 = 0010 ==> (0100 = 4) | =4, failed |
| 3 = 0011 ==> (1100 = 12) | >4, failed |
| 4 = 0100 ==> (0010 = 2) | <4, passed |
| 5 = 0101 ==> (1010 = 10) | >4, failed |
| 6 = 0110 ==> (0110 = 6) | >4, failed |
| 7 = 0111 ==> (1110 = 14) | >4, failed |
| 8 = 1000 ==> (0001 = 1) | <4, passed |
| 9 = 1001 ==> (1001 = 9) | >4, failed |
| 10 = 1010 ==> (0101 = 5) | >4, failed |
| 11 = 1011 ==> (1101 = 13) | >4, failed |
| 12 = 1100 ==> (0011 = 3) | <4, passed |
| 13 = 1101 ==> (1011 = 11) | >4, failed |
| 14 = 1110 ==> (0111 = 7) | >4, failed |
| 15 = 1111 ==> (1111 = 15) | >4, failed |

In the present embodiment, any blocked threads are also prevented from updating the LRU (least recently used) data of the caches. This helps to avoid a livelock situation in which multiple cache-lines are needed, but data is simply written to the same cache-line over and over again.

Furthermore, in the present embodiment, where the caches $C_1, C_3, C_N$ have locking mechanisms, the blocked threads are also prevented from reading (getting a hit on) the LRU cache-line. This helps to prevent deadlock situations in which the LRU-line needs to be updated, but at the same time is locked.

As can be seen from the above, the present invention, in its preferred embodiments at least, provides a method and system of recovering from a livelock state without the loss of, and/or any permanent detrimental effect on, the threads passing through the pipeline.

Although the present invention has been described with particular reference to graphics processing, as will be appreciated by those skilled in the art, the present invention can be used for other pipelined microprocessor arrangements, and indeed, for other pipelined graphics processing arrangements. Furthermore, it will be understood by those skilled in the art that various changes in form and detail may be made to the particular embodiments discussed above without departing from the scope of the invention as set forth in the accompanying claims.

The invention claimed is:

1. A method of operating a microprocessor system that includes a pipeline comprising a plurality of functional units arranged in a pipelined fashion and in which at least one stage in the pipeline can process a thread for execution at the same time as other stages in the pipeline are processing other threads for execution, one or more of the functional units each including or having associated with it a cache memory for data to be used by the functional unit when processing a thread, the method comprising:
    detecting whether the system is in a livelock state and if a livelock state is detected, reducing the number of threads in the pipeline that are allowed to change the contents of one or more of the caches; and
    progressively decreasing the number of threads that are able to change the contents of one or more of the caches until it is determined that the system is no longer in a livelock state.

2. The method of claim 1, wherein said step of detecting whether the system is in a livelock state comprises at least one of identifying and determining whether a thread has been processed by at least one of the functional units in the pipeline in a predefined or predetermined period.

3. The method of claim 1, wherein said step of detecting whether the system is in a livelock state comprises:
    monitoring the progress of threads through the pipeline as a whole so as to determine whether the system is in a livelock state; and
    simultaneously, monitoring the progress of threads in one or more particular portions of the pipeline so as to determine whether one or more portions of the system are in a livelock state.

4. The method of claim 3, further comprising:
    if a livelock state is detected in a particular portion of the pipeline, preventing one or more of the threads from being able to fetch data into a cache or caches associated with the particular portion of the pipeline in which livelock was detected.

5. The method of claim 1, wherein one or more of the threads have associated with them information indicating whether the thread is able to fetch data into one or more of the caches.

6. The method of claim 1, further comprising:
    repeatedly detecting whether the system is in a livelock state.

7. The method of claim 1, further comprising:
    progressively increasing the number of threads able to change the contents of one or more of the caches once it is determined that the system is no longer in a livelock state.

8. A microprocessor system for processing a plurality of threads, the system comprising:
- a pipeline comprised of a plurality of functional units arranged in a pipelined fashion, one or more of the functional units configured to receive and process a thread received from the preceding functional unit in the pipeline and to pass a thread after processing to the next functional unit in the pipeline, and one or more of the functional units each including or having associated with it a cache memory for data to be used by the functional unit when processing a thread;
- at least one livelock monitor for detecting whether the system is in a livelock state; and
- processing logic configured to reduce the Dumber of threads in the pipeline that are allowed to change the contents of one or more of the caches if a livelock state is detected; and processing logic configured to progressively decrease the number of threads able to change the contents of one of more of the caches until it is determined that the system is no longer in a livelock state.

9. The microprocessor system of claim 8, wherein said at least one livelock monitor comprises at least one of means for identifying and means for determining whether a thread has been processed by at least one of the functional units in the pipeline in a predefined or predetermined period.

10. The microprocessor system of claim 8, wherein said at least one livelock monitor comprises:
- a first livelock monitor for monitoring the progress of threads through the pipeline as a whole so as to determine whether the system is in a livelock state; and
- one or more second livelock monitors for monitoring the progress of threads in a particular portion of the pipeline so as to determine whether one or more portions of the system are in a livelock state.

11. The microprocessor system of claim 10, wherein said one or more second livelock monitors are each included in or associated with one of the functional units.

12. The microprocessor system of claim 8, wherein one or more of the threads have associated with them information indicating whether the thread is able to fetch data into one or more of the caches.

13. The microprocessor system of claim 8, further comprising:
- processing logic configured to progressively increase the number of threads able to change the contents of one or more of the caches once it is determined that the system is no longer in a livelock state.

14. A computer program product comprising a non-transitory computer readable storage medium including software which, when installed on a computer, carries out the method of claim 1.

* * * * *